US010655772B2

(12) United States Patent
Larsen et al.

(10) Patent No.: US 10,655,772 B2
(45) Date of Patent: May 19, 2020

(54) ASSEMBLY COMPRISING AN END-FITTING AND AN UNBONDED FLEXIBLE PIPE (71) Applicant: National Oilwell Varco Denmark I/S, Brondby (DK)

(72) Inventors: Tom Larsen, Roskilde (DK); Thorsten Holst, Taastrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 152 days.

(21) Appl. No.: 15/516,695

(22) PCT Filed: Oct. 14, 2015

(86) PCT No.: PCT/DK2015/050318
§ 371 (c)(1),
(2) Date: Apr. 4, 2017

(87) PCT Pub. No.: WO2016/062319
PCT Pub. Date: Apr. 28, 2016

(65) Prior Publication Data
US 2017/0299092 A1 Oct. 19, 2017

(30) Foreign Application Priority Data

Oct. 20, 2014 (DK) .................................. 2014 00596
Aug. 10, 2015 (DK) .................................. 2015 70510

(51) Int. Cl.
F16L 53/00 (2018.01)
F16L 53/38 (2018.01)
(Continued)

(52) U.S. Cl.
CPC ............. F16L 53/38 (2018.01); B23P 19/047 (2013.01); F16L 11/04 (2013.01); F16L 11/12 (2013.01);
(Continued)

(58) Field of Classification Search
CPC . F16L 53/38; F16L 53/34; F16L 11/12; F16L 25/01; F16L 33/01
(Continued)

(56) References Cited

U.S. PATENT DOCUMENTS 2,883,513 A 4/1959 Schnabel
4,225,158 A * 9/1980 Puechavy ............... F16L 33/01
285/222.2
(Continued)

FOREIGN PATENT DOCUMENTS

EP 1 867 907 A1 12/2007
EP 2 493 262 B1 8/2012
(Continued)

OTHER PUBLICATIONS

"Recommended Practice for Flexible Pipe"; ANSI/API Recommended Practice 17B, Fourth Edition; Jul. 2008; pp. 1-213.
(Continued)

Primary Examiner — James F Hook
(74) Attorney, Agent, or Firm — Pearne & Gordon LLP (57) ABSTRACT The present invention relates to an assembly including an end-fitting and an unbonded flexible pipe, which end-fitting is adapted for connecting the unbonded flexible pipe to a connector. The end-fitting has a through-going opening with a centerline and a front end and a rear end, and the end-fitting further provides for establishing an electrical connection to a least one electrical heating system in the unbonded flexible pipe. Moreover, the end-fitting includes at least one first metallic part having a first surface contacting a second surface of at least one second part in the end-fitting, wherein the first surface of the first metallic part, at least in the vicinity of the through-going opening, includes a coating having a high electrically resistivity. The invention also
(Continued)

relates to a method for providing an end-fitting having good properties in respect of reducing galvanic corrosion.

21 Claims, 3 Drawing Sheets (51) Int. Cl.
| | |
|---|---|
| *F16L 25/01* | (2006.01) |
| *F16L 33/01* | (2006.01) |
| *F16L 53/34* | (2018.01) |
| *B23P 19/04* | (2006.01) |
| *F16L 11/04* | (2006.01) |
| *F16L 11/12* | (2006.01) |

(52) U.S. Cl.
CPC ............... *F16L 25/01* (2013.01); *F16L 33/01* (2013.01); *F16L 53/34* (2018.01)

(58) Field of Classification Search
USPC ............................ 138/33, 109, 135; 285/423
See application file for complete search history.

(56) References Cited

U.S. PATENT DOCUMENTS

| | | | | |
|---|---|---|---|---|
| 4,950,001 A * | 8/1990 | Briggs | ................... | F16L 47/02 |
| | | | | 285/222.1 |
| 5,289,561 A | 2/1994 | Filho | | |
| 5,975,119 A * | 11/1999 | Silva | ........................ | E03B 7/12 |
| | | | | 137/341 |
| 6,039,083 A | 3/2000 | Loper | | |
| 6,142,707 A * | 11/2000 | Bass | ..................... | E21B 17/015 |
| | | | | 405/158 |
| 6,273,142 B1 | 8/2001 | Braad | | |
| 6,315,497 B1 * | 11/2001 | Wittman | ............... | E21B 17/015 |
| | | | | 405/158 |
| 6,360,781 B1 | 3/2002 | Braad | | |
| 6,412,825 B1 | 7/2002 | Langkjaer | | |
| 8,997,792 B2 * | 4/2015 | Betsinger | ................ | F16L 57/06 |
| | | | | 138/104 |
| 2002/0190522 A1 * | 12/2002 | Grepaly | .................. | F16L 33/01 |
| | | | | 285/222.1 |
| 2004/0066035 A1 * | 4/2004 | Buon | .................... | F16L 33/003 |
| | | | | 285/222.2 |
| 2006/0201566 A1 * | 9/2006 | Brink | ...................... | F16L 33/01 |
| | | | | 138/109 |
| 2010/0084035 A1 * | 4/2010 | Binet | .................... | F16L 11/083 |
| | | | | 138/104 |
| 2010/0308575 A1 * | 12/2010 | Rodenburg | ........... | F16L 11/127 |
| | | | | 285/256 |
| 2015/0252929 A1 * | 9/2015 | Jaspaert | .................. | F16L 53/30 |
| | | | | 285/41 |
| 2016/0097471 A1 * | 4/2016 | Moller Andersen | .... | F16L 33/01 |
| | | | | 138/103 |
| 2016/0178106 A1 | 6/2016 | Glejbol | | |
| 2016/0290539 A1 * | 10/2016 | Nielsen | ................... | F16L 33/01 |

FOREIGN PATENT DOCUMENTS

| | | |
|---|---|---|
| EP | 3 040 593 A1 | 7/2016 |
| FR | 3 006 032 A1 | 11/2014 |
| GB | 1 552 583 | 9/1979 |
| WO | 99/19655 A1 | 4/1999 |
| WO | 99/19656 A1 | 4/1999 |
| WO | 2015/014365 A1 | 2/2015 |
| WO | 2017/025096 A1 | 2/2017 |

OTHER PUBLICATIONS

"Specification for Unbonded Flexible Pipe"; ANSI/API Specification 17J, Third Edition; Jul. 2008; pp. 1-73.
International Search Report for PCT/DK2015/050318 dated Jan. 12, 2016.
Denmark Search Report for PA 2014 00596 dated May 21, 2015.
Extended European Search Report for 15 85 2520 dated Apr. 24, 2018.

\* cited by examiner

ASSEMBLY COMPRISING AN END-FITTING AND AN UNBONDED FLEXIBLE PIPE

The present invention relates to an assembly comprising an end-fitting and an unbonded flexible pipe, where the end-fitting comprises means for establishing an electrical connection to a least one electrical heating system in the unbonded flexible pipe.

TECHNICAL FIELD

End-fittings and unbonded flexible pipes are used for transport of hydrocarbons such as oil and gas, and in particular the end-fittings and the unbonded flexible pipes are used for off-shore transport of oil and gases. The unbonded flexible pipe e.g. conveys the hydrocarbons from a subsea installation to a vessel floating on the sea surface. The unbonded flexible pipe is terminated at each end in an end-fitting which connects the unbonded flexible pipe to the subsea installation and the vessel, respectively.

End-fittings and unbonded flexible pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. The unbonded flexible pipes usually comprise an internal pressure sheath—often referred to as an innermost sealing sheath or inner liner, which forms a barrier against the outflow of the fluid which is conveyed in the bore of the pipe, and one or usually a plurality of armour layers. Normally the pipe further comprises an outer protection layer, often referred to as the outer sheath, which provides mechanical protection of the armour layers. The outer protection layer may be a sealing layer sealing against ingress of sea water. In certain unbonded flexible pipes one or more intermediate sealing layers are arranged between armor layers. The different layers are terminated in the end-fitting, meaning that the layers are fastened and locked in the end-fitting by use of e.g. mechanical means, welding, or potting using e.g. a filled epoxy resin. Thus, the end-fitting forms a transition between the unbonded flexible pipe and a connection on the vessel or the subsea installation.

In practice the known pipe normally comprises at least two armour layers located outside the internal pressure sheath and optionally an armour structure located inside the internal pressure sheath, which inner armour structure normally is referred to as the carcass. These armour layers are terminated in the end-fitting, which is normally made from a metal alloy. The carcass is normally terminated by a ring comprising a screw lock which is mechanical attached to the end-fitting. The armour layers outside the internal pressure sheath are usually terminated in cavities in the end-fitting and locked by use of e.g. epoxy resin. The armour layers on the outer side of the internal pressure sheath are normally constituted by one or two pressure armour layers and one or two tensile armour layers. The outer sheath may be terminated and attached to the end-fitting by mechanical means. The termination of an unbonded flexible pipe in an end-fitting is normally a manual process which is carried out according to the customers need.

One problem which frequently arises when the unbonded flexible pipe is used offshore for transport of fluids of hydrocarbons is that the fluid is cooled by the surrounding sea water to a degree so the fluid becomes highly viscous and difficult to transport. In some situations the bore of the pipe may be blocked by solidified hydrocarbons, which may eventually block the pipe. This problem is normally addressed by applying thermal insulation layers or active heating, such as electric heating Both the solution of applying thermal insulation layers and the solution using electric heating function quite well. However, due to the high flexibility of electric heating this solution tends to become more and more widespread for use in unbonded flexible pipes.

The electric heating is realized by having electric wires along the length of the pipe and sending a current through the wires. In a recent developed method for electric heating of unbonded flexible pipes it has been found that one or more of the metallic armour layer may be used for heating, by passing a current through the armour layer. Due to the inherent electric resistance in the metallic armour layers a heating effect may be achieved.

Normally, the electric connections between the electric power source providing the electric power for heating and the heating element will be established in the end-fitting. As the unbonded flexible pipes may have a substantial length of several hundred meters or more, it is required to use rather high currents (300 A or more) to obtain a satisfactory heating in the pipes. Moreover, to force these currents through the pipes high voltages are required (1000 V or more).

To protect internal parts of an end-fitting cladding of the end-fitting components is normal procedure, to enhance nobility of the surface and to increase resistance towards wear, abrasion and corrosion. A commonly used material for internal cladding of end-fitting components is the super alloy Inconel (trademark of Special Metals Corporation) which has good properties in respect of resisting wear, abrasion and corrosion. However, Inconel also has good electrically conductive properties. Other means to protect internal parts of the end-fitting comprises seals and gaskets.

The international patent application PCT/DK2014/050109 discloses an offshore system comprising an unbonded flexible pipe terminated in end-fittings at each end. The offshore system includes an electrical heating system utilizing the carcass and the armour layers in the unbonded flexible pipe. To avoid damage caused by galvanic corrosion and spark formation in the end-fitting the through-going opening in the end-fitting is electrically insulated, e.g. by an extension of the internal pressure sheath of the unbonded flexible pipe or by application of a layer insulating material, such as rubber.

When unbonded flexible pipes comprise electrical heating systems electric wiring is required to establish electrical contact between a power source and the electrical heating system. The electric wiring in the end-fitting and the connections to the heating means, i.e. the wires or armour layer in the pipe, are well insulated, e.g. by means of electrical insulating seals and gaskets. The layers of the polymer material in the unbonded flexible pipe, i.e. the internal pressure sheath, the outer sheath and optionally thermal insulating layers may also function as electrical insulating layers. However, in operation it has been found that stray currents may occur. Stray current refers to the electricity flow via structures, ground or equipment due to electrical supply system imbalances or wiring flaws. It refers to an existence of electrical potential that can be found between objects that should not be subjected to voltage. The occurrence of stray currents is highly undesirable as they may cause sparks to be formed, which is highly undesired. Moreover, the stray currents may lead to galvanic corrosion in parts of the end-fitting which is also undesired.

DISCLOSURE OF INVENTION

An object of the present invention is to obtain an assembly comprising and end-fitting connected with an unbonded flexible pipe which comprises an electric heating system where the assembly has improved properties in respect of eliminating undesired effects of stray currents.

A further object is to provide an end-fitting adapted for electric heating of an unbonded flexible pipe which end-fitting has good resistance towards galvanic corrosion.

The present invention relates to an assembly comprising an end-fitting and an unbonded flexible pipe, said end-fitting being adapted for connecting the unbonded flexible pipe to a connector, said end-fitting having a through-going opening with a centerline and a front end and a rear end, said end-fitting further comprises means for establishing an electrical connection to a least one electrical heating system in said unbonded flexible pipe, said end-fitting comprises at least one first metallic part having a first surface contacting a second surface of at least one second part in the end-fitting, wherein the first surface of the first metallic part, at least in the vicinity of the through-going opening, comprises a coating having a high electrically resistivity.

The term "unbonded" means in this text that at least two of the layers including the armour layers and polymer layers are not bonded to each other.

The term "high electrically resistivity" means that electrically resistivity is at least $10^7$ $\Omega \cdot m$ The term "in the vicinity of the through-going opening" means an area surrounding the through-going opening, which do not necessarily include the entire end-fitting. In practice the area may be considered to be an area which is comprised within an imaginary cylindrical body having top and bottom coincident with the rear end and the front end of the end-fitting, respectively, and an axis coincident with the centerline of the through-going opening and a radius which is between one and a quarter and one and a half time larger than the radius of the through-going opening at the rear end of the through-going opening. Thus, if the through-going opening has a radius R at the rear end, the vicinity of the through-going opening is an area which is found between 1 R to 1½ R into the material surrounding the through-going opening, when measured from the center-line and in a plane perpendicular to the centerline of the through-going opening.

The term "surface contacting a surface" means that the surfaces of two different parts are so close that there is a physical contact between the surfaces, and if the parts are electrically conductive and their surfaces are electrically conductive, there will be electrical connection between the two parts.

In operation the through-going opening of the end-fitting is connected with the bore of the unbonded flexible pipe so the through-going opening may be seen as acting as an extension of the bore, and fluid conveyed in the bore passes through the through-going opening from the bore to a connector. The connector provides a leak-tight structural connection between the end-fitting and adjacent piping.

The through-going opening can in principal be seen as a substantially cylindrical shaped passageway through the end-fitting. However, this is not entirely true. The through-going opening comprises parts with recesses, necks, and indentations for terminating the unbonded flexible pipe. In this context all these parts are included in the term "through-going opening". However, when the unbonded flexible pipe is terminated in the end-fitting, the through-going opening of the end-fitting and the bore of the unbonded pipe form a substantial cylindrical shaped passageway through the end-fitting.

The term "substantially" should herein be taken to mean that ordinary product variances and tolerances are comprised.

The unbonded flexible pipe enters the end-fitting at the front end and is terminated in the end-fitting by use of well-known methods. When the unbonded flexible pipe is terminated in the end-fitting the centerline of the end-fitting may be construed as an extension of the axis of the pipe. The rear end of the end-fitting comprises means for connecting the end-fitting to the connector. The end-fitting comprises metallic parts and these parts are in a conventional end-fitting mainly the inner casing and the outer casing (using the nomenclature of "Recommended Practice for Flexible Pipe", ANSI/API 17 B, fourth Edition, July 2008). Moreover, the end-fitting may comprise other metallic parts, such as e.g. ring-shaped members serving to fix layers of the unbonded flexible pipe in the end-fitting. Although alternative materials are available for the manufacture of end-fittings e.g. polymer materials, metallic materials are, however, still preferred due to the mechanical properties, workability, and cost.

The end-fitting according to the invention is adapted with electric wiring for establishing electrical contact between an electric power source and an electric heating system in the unbonded flexible pipe. The wiring may be copper wires which are led through one or more passageways in the end-fitting to connection points on the electric heating element. The wiring may also be aluminium wires and also comprise rods, such a copper or aluminium rod. Although the wires and connection points are regulatory insulated, it has, however, been found that stray currents may appear in the end-fitting. The stray currents may be very weak, but they may still be able to cause corrosion on unprotected metallic surfaces.

The stray currents were not expected to appear in the end-fittings, due to the proper use of electric insulation. However, it has been found that stray current may appear and a non-binding theory is that when the unbonded flexible pipe is pressurized, which will happen when the pipe conveys oil and gas, very thin films may be formed from water or other electrically conductive fluids on surfaces or between contacting surfaces in the end-fitting. The water and other electrically conductive fluids originates from the fluid conveyed in the bore of the unbonded flexible pipe and it is almost impossible to avoid formation of such films during use of the unbonded flexible pipe when the fluid conveyed in the pipe is pressurized. The thin films formed from water or other electrically conductive fluids, i.e. conductive films, may be able to penetrate between interfaces between different parts in the end-fitting and get into contact with electrical conductive parts and then function as paths for stray current, and this stray currents may result in galvanic corrosion in the metallic parts of the end-fitting.

As the end-fitting generally is made from a metallic alloy, such as e.g. AISI 4130 low alloy steel which may conduct an electric current, this metallic alloy is also sensitive to differences in electric potentials, and, thus, sensitive to galvanic corrosion. Consequently, the stray currents may cause galvanic corrosion.

It has been found that occurrence of stray current resulting in galvanic corrosion may by significant reduced or even avoided in the end-fitting if the surfaces of metallic parts, at least in the vicinity of the through-going opening, comprises a coating having a high electrically resistivity. As it is assumed that the stray currents is mainly caused be electrical conductive films spreading from the fluid in the through-going opening into interfaces in the end-fitting, and it is believed that the conductive films are only able to penetrate a limited distance into the interfaces, and, thus, it is assumed that normally it will only be required to treat metallic surfaces in the vicinity of the through-going opening to avoid damage caused be stray current.

In an embodiment the coating is an electrically insulating coating having an electrically resistivity of at least $10^7$ Ω·m. More preferred an electrically resistivity of at least $10^8$ Ω·m, such as an electrically resistivity of at least $10^9$ Ω·m, conveniently an electrically resistivity of at least $10^{10}$ Ω·m.

In an embodiment of the assembly at least a part of the coating comprises a bushing. A bushing is very easy to mount in the through-going opening of the end-fitting and may not require as much work as other types of coatings. The bushing is preferably manufactured from a material which is electrically insulating and having an electrically resistivity of at least $10^7$ Ω·m or more. Preferably the bushing is made from a polymer material such as epoxy, polyethylene, polyvinyl chloride, polyetheretherketone, polytetrafluoroethylene, fluorinated ethylene propylene or combinations thereof.

In an embodiment of the end-fitting according to the invention the first part is a metallic part, and also the second part is a metallic part and each of the surfaces between the first and the second metallic parts comprise a coating having a high electrically resistivity. This embodiment is particular suitable if a conductive film penetrates into the interface between the two interconnected surfaces, i.e. the first and the second surface of metallic parts. If the first and the second surface are coated with a coating having a high electrically resistivity, the coating will function as an electric insulator and the conductive film will not be able to transfer current to the metallic parts.

In an embodiment of the end-fitting according to the invention the second part is a non-metallic part, e.g. the second part is an insulating part. In this embodiment the second part may be an insulating part, such as a gasket, e.g. serving to insulate the electric contact point in the end-fitting, i.e. the points where the electric wiring is connected to the heating element in the unbonded flexible pipe.

Generally, the metallic surfaces of the through-going opening is protected by an insulating layer, e.g. by the internal pressure sheath of the unbonded flexible pipe or an insulating layer of e.g. rubber or polymer material. However, in an embodiment the metallic surfaces in the through-going opening comprises a coating having a high electrically resistivity. This embodiment may be useful in case there is an opening in the insulating layer which may form a passageway from the fluid convoyed in the bore to the metallic surface of the through-going opening. If the passageway has a sufficient size a conductive film may be able to pass through the passageway and into to the interface between the insulating layer and the surface of the through-going opening. In this interface between the insulating layer and the metallic surface of the through-going opening the conductive film may lead to galvanic corrosion if the surface of the through-going opening is not protected by a coating having a high electrically resistivity.

In an embodiment all metallic surfaces in the end-fitting is coated with a coating having a high electrically resistivity. This embodiment provides a very good protection against the risk of galvanic corrosion.

Moreover, in an embodiment of the assembly according to the invention, the metallic surface of a metallic part in the end-fitting in contact with an insulating material comprises a coating having a high electrically resistivity. Thus, if it should happen that a conductive film penetrates into the interface between the metallic surface and the surface of the insulating material the coating on the metallic surface will protect against galvanic corrosion.

Several materials, in particular insulating materials will be suitable as coating material according to the invention, and advantageously the coating is selected from an epoxy coating, a polyurethane coating, a polytetrafluoroethylene coating, a fluorinated ethylene propylene coating, a polyvinyl chloride coating, an enamel coating a ceramic coating, a glass coating and combinations thereof. Such coating will all have an electrically resistivity of at least $10^7$ Ω·m and may serve to reduce the presence of stray currents and the risk of galvanic corrosion on metallic surface of the end-fitting. A ceramic coating may be applied as a powder or paste which is then heated to form the ceramic coating. A glass coating may be applied as liquid material at high temperature and subsequently cooled to form the glass coating.

The thickness of the applied coating depends on the nature of the coating material and will normally be decided by a skilled person. The coating is advantageously applied with a thickness from about 0.05 mm to about 5 mm, suitable with a thickness from about 0.1 mm to about 4 mm, and conveniently with a thickness from about 0.2 mm to about 3 mm.

Besides a coating with high electrically resistivity, the through-going opening in the end-fitting may also comprise insulating members such as seals or gaskets, e.g. made from a rubber or polymer material. Other parts than e.g. the through-going opening in the end-fitting may also be coated with an electrical insulating material, i.e. the outer surface of the end-fitting may e.g. be coated with an epoxy coating or other suitable electrical insulating material. The outer surface of the end-fitting is the surface which is in contact with the surrounding environment, e.g. the atmosphere or sea water.

Although it hitherto has been a normal procedure to cover the surface of the through-going opening with a cladding, e.g. a cladding of the alloy Inconel, these claddings are like Inconel electrically conductive. The claddings have not been applied for the purpose of increasing electric resistance, but rather for the purpose of improving the mechanical properties, such as resistance towards wear. However, it has been found that coatings with high electrical resistance also may resist wear and in fact are suitable for use in the through-going opening in an end-fitting.

The end-fitting according to the invention comprises means for establishing an electrical connection to a least one electrical heating system in the unbonded flexible pipe serving to provide electric heating in the unbonded flexible pipe. In an embodiment the unbonded flexible pipe comprises only one electrical heating system.

In an embodiment the unbonded flexible pipe comprises two or more electrical heating systems. Thus, if one heating system fails a second heating system may be operative.

In an embodiment the electrical heating system comprises one or more wires. Electrical conductive wires can be included in the structure of the unbonded flexible pipe without causing any major impact on the structure, and the wires will function well as a heating element.

In an embodiment the electrical heating system comprises one or more of the armour layers in the unbonded flexible pipe. In the majority of unbonded flexible pipes, the armour layers are made from metallic alloys which are electrically conductive, and, therefore, suitable for use as an electric heating element in the unbonded flexible pipe. Consequently, the electric heating system may comprise a carcass, a tensile armour and/or a pressure armour. Thus, utilizing the one or more of the armour layer provides a very simple and cost-effective way of providing electric heating in an unbonded flexible pipe.

In an embodiment the carcass serves as the heating element. The first end of the unbonded flexible pipe is terminated in a first end-fitting according to the invention and the carcass is connected with electric wiring from a power source, e.g. at the carcass ring. At the second end the unbonded flexible pipe is terminated in a second end-fitting according to the invention, and the carcass is electrical connected with the tensile armour in the pipe via electric wiring in the second end-fitting. In the first end-fitting the tensile armour is connected with to the power source via wiring in the end-fitting. Thus, an electrical circuit is established between the first and the second end-fitting by means of wiring in the two end-fittings and the carcass and the tensile armour in the unbonded flexible pipe. There will be at least one insulating layer between the carcass and the pressure armour in the pipe, namely the internal pressure sheath. Optionally one or more thermal insulating layers which will also function as electrically insulating layers may be placed between the carcass and the pressure armour. Electrically insulating layers may also be located between the pressure armour and the tensile armour. The electrical circuit is adjusted so the carcass will function as a heating element. By use of an assembly according to the invention undesired stray currents and optionally short cuts may be avoided.

In an embodiment of the assembly the end-fitting comprises a protective sleeve. The protective sleeve is mainly used when the end-fitting is transported and may be removed when the end-fitting is installed for operation. The protective sleeve may be made from metallic material, such as e.g. stainless steel or polymer material, such as e.g. polyethylene or polyvinylidene fluoride. The protective sleeve may be re-usable.

In an embodiment the end-fitting is housed in an electrical insulating housing. The housing may be a barrel shaped housing encapsulating the end-fitting, thus, the housing not necessarily have to fit with the end-fitting shape. The main purpose of the housing is serve to inhibit stray current from the end-fitting to reach the environment, e.g. when the end-fitting is mounted for operation in sea water. The electrically insulating housing is preferably manufactured from polymer material with electrical insulating properties, such as epoxy, polyurethane, polytetrafluoroethylene, fluorinated ethylene propylene, or polyvinyl chloride.

In an embodiment the housing may also be adapted to serve as a protective cover for the end-fitting during transport.

In an embodiment the present invention also relates to a method for reducing the risk of galvanic corrosion in an end-fitting for connecting an unbonded flexible pipe comprising electrical heating means to a connector. The method comprises:

providing an end-fitting having a through-going opening with a centerline and a front end and a rear end, and comprising means for establishing an electrical connection to the heating means in said unbonded flexible pipe, said end-fitting comprises at least one first metallic part having a first surface adapted for contacting a second surface of at least one second part in the end-fitting;

subjecting the first surface of the first metallic part for a treatment to obtain a substantially clean first surface;

applying a coating having a high electrically resistivity to the cleaned first surface; and curing the applied coating to obtain a coating on the first surface having a high electrically resistivity.

Normally an end-fitting is made from material, of which a major part is a metallic material, e.g. a metallic alloy such as e.g. AISI 4130 low steel alloy. A minor part of the end-fitting may be other materials, such as e.g. coating material and rubber used for gaskets and insulation. Thus, a major part of the end-fitting, the metallic parts, such as the inner casing and the outer casing, is capable of conducting an electric current. However, by use of the method there is provided an end-fitting with good properties in respect of electrically insulation, whereby galvanic corrosion due to stray currents may be significantly reduced. In particular there is provided an end-fitting having means, such as electric wiring for connecting electric heating means in the unbonded flexible pipe with a source for electric power. The source for electric power is connected to the electric heating means in the unbonded flexible pipe via the end-fitting.

As previously mentioned the through-going opening is not a smooth bore as such, but also comprises recesses, indentations, cavities, packing and clamps serving to terminate the unbonded flexible pipe, and these parts, when being metallic and electrically conductive parts, may also be treated according to the invention.

Although the electric wiring and contact points are insulated, it is, however, possible that stray currents may appear in the metallic material of the end-fitting. To counter the effect of stray currents the method provides a coating on the metallic surfaces of the through-going opening, which coating has a high electrically resistivity and will function as an insulating coating, which will prevent an electric current in being transferred to or from the metallic material below the coating. The coating may be applied to the entire metallic surfaces of the end-fitting or only to parts of the metallic surfaces in the end-fitting. In the latter case it is preferred to apply the coating to the surface of metallic parts where the surface may be vulnerable to corrosion.

According to the method according to the invention a first surface of a first metallic part is coating with a coating having a high electrically resistivity. The coating may serve as an electrically insulator serving to reduce the dissemination of stray current.

In an embodiment of the method the second part is a metallic part and the second surface of the second part is subjected to a treatment to obtain a substantially clean second surface and applying the clean second surface with a coating having a high electrical resistance. In this embodiment both the first and the second surfaces are applied with a coating providing an electrically insulation an preventing electrically contact between the first and the second metallic part, thereby reducing the possible of stray currents in the metallic parts.

According to an embodiment of the method the coating is an electrically insulating coating having an electrically resistivity of at least $10^7$ $\Omega \cdot m$. More preferred an electrically resistivity of at least $10^8$ $\Omega \cdot m$, such as an electrically resistivity of at least $10^9$ $\Omega \cdot m$, conveniently an electrically resistivity of at least $10^{10}$ $\Omega \cdot m$.

In principle any material which can be applied as a coating and having an electrically resistivity of at least $10^7$ $\Omega \cdot m$ is suitable for use in the present method. However in an embodiment of the method the coating is selected from an epoxy coating, a polyurethane coating, a polytetrafluoroethylene coating, a fluorinated ethylene propylene coating, an enamel coating and combinations thereof. These materials have a high electrically resistivity and also acceptable mechanical properties for use in an end-fitting.

The applied coating may be cured simply be contact with atmospheric air, or by use of a curing aid, such as e.g. heat or light.

The thickness of the coating should be in a range which ensure proper electrically resistivity and sufficient resistance towards wear and in an embodiment of the method the coating is applied with a thickness from about 0.05 mm to about 5 mm, such as with a thickness from about 0.1 mm to about 4 mm, and suitable with a thickness from about 0.2 mm to about 3 mm. The coating may e.g. be applied by spraying, powder coating, fusing or by application by brush.

Before the coating is applied, the surface on which the coating is to be applied is treated to provide a clean surface on which the coating may adhere. Advantageous the treatment of the surface is a sand blasting, a mechanical cleaning, a chemical etching, an electro polishing or a combination of two or more of the mentioned treatments.

In an embodiment the method comprises the further step of applying an adhesive layer to the cleaned surface. The purpose of the adhesive layer is to improve the adhesion of the coating to the surface of the through-going opening. The adhesive layer may be based on epoxy or polyurethane or similar compounds. In some embodiments the coating is bond to the adhesive layer by cross-linking. Thus, the adhesive will be selected so it is suitable for cross-linking, such as a polyurethane-based adhesive. The cross-linking may e.g. be initiated by heat, light-emission, such as from a laser or by peroxides, and other know methods for cross-linking polymer materials.

DETAILED DESCRIPTION OF THE INVENTION

The invention will now be described in further details with reference to embodiments shown in the drawing in which.

The figures are not accurate in every detail but only sketches intended to the show the principles of the invention. Details which are not a part of the invention may have been omitted. In the figures the same reference signs are used for the same parts.

Figure 1:
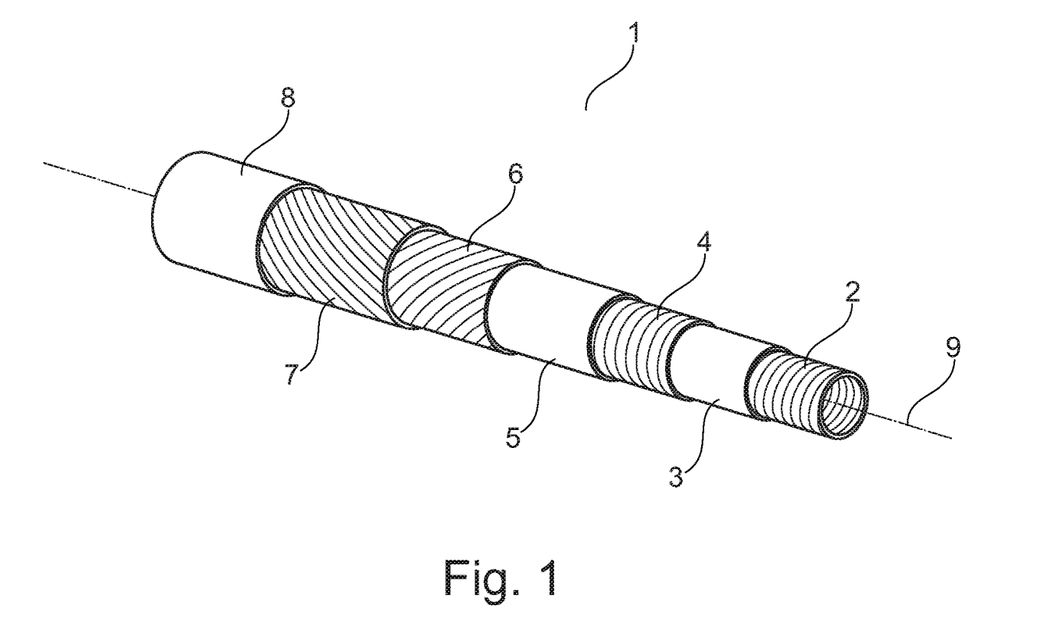
FIG. 1 shows an unbonded flexible pipe for use in an assemble according to the invention.

FIG. 1 shows an unbonded flexible pipe 1. The pipe 1 comprises a carcass 2 which constitutes an inner armour layer inside the internal pressure sheath 3, which is fluid tight. On the outer surface of the internal pressure sheath 3 is found a pressure armour 4 which surround and protect the internal pressure sheath. The pressure armour is surrounded by an electrical insulating layer 5. Around the electrical insulating layer 5 are wound two tensile armour layers 6 and 7. The tensile armour layers 6 and 7 are surrounded by an outer sheath 8.

The internal pressure sheath 3 defines the bore of the pipe with the axis 9. The internal pressure sheath 3 is an extruded layer made from a polyethylene (PE) or a polyvinylidene fluoride (PVDF) material. The insulating layer 5 is also a fluid-tight layer made from polyethylene (PE) or polyvinylidene fluoride (PVDF) material. The outer sheath 8 is a fluid-tight layer, which should protect the pipe from e.g. ingress of water into the armour layers. The outer sheath is made from polyethylene or polypropylene (PP)

The carcass 2, the pressure armour 4 and the tensile armour layers 6, 7 are made from a metallic material which are electrically conductive, such as stainless steel.

Figure 2:
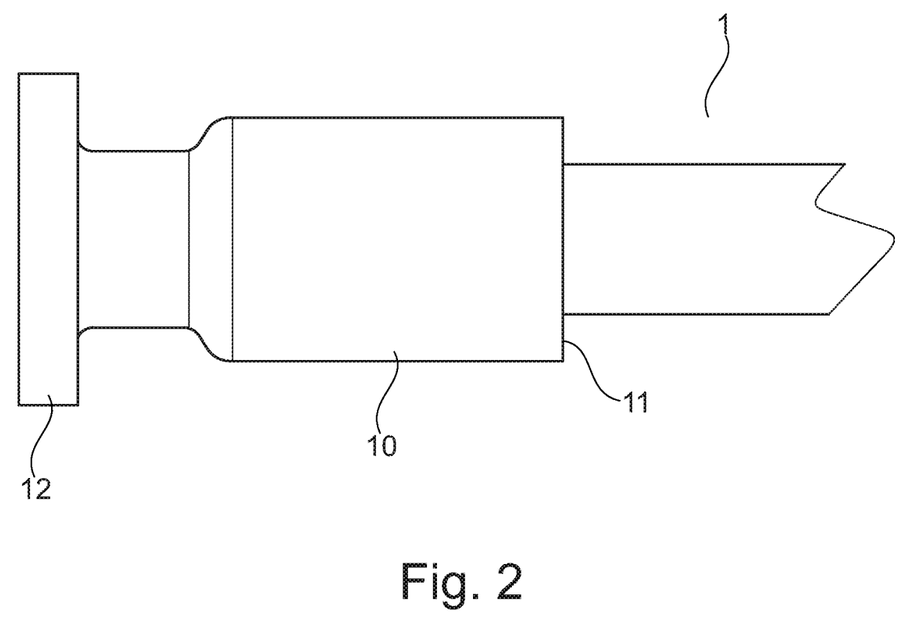
FIG. 2 shows an end-fitting for use in an assemble according to the invention.

FIG. 2 shows an unbonded flexible pipe 1 and an end-fitting 10 forming an assembly where the unbonded flexible 1 enters the end-fitting at front end 11 and is terminated in the end-fitting 10. At the rear end 12 the end-fitting comprises a flange by which the end-fitting may be attached to a connector.

Figure 3:
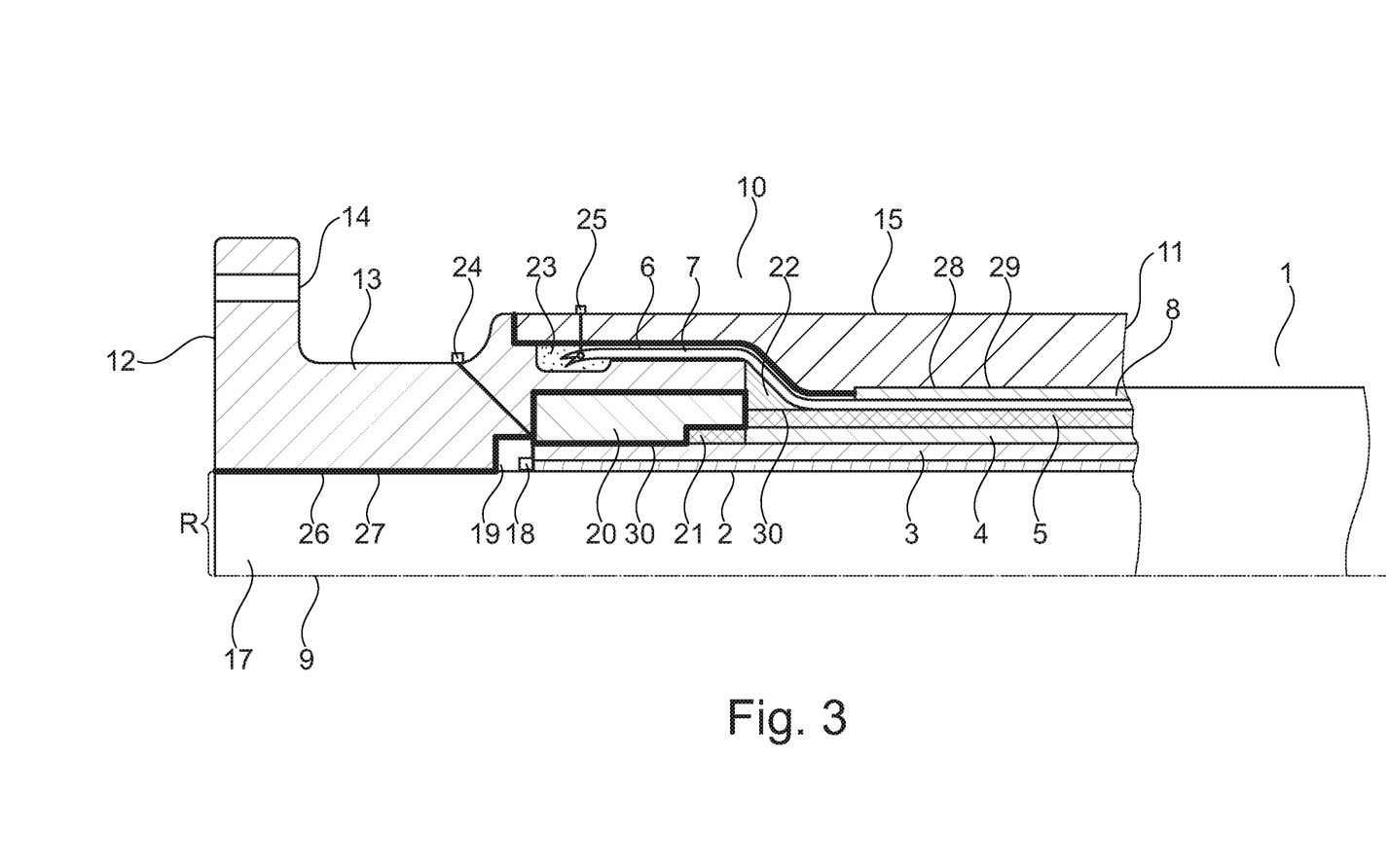
FIG. 3 shows a section of the assembly.

FIG. 3 shows a section of the end-fitting 10 and the principles of how the unbonded flexible pipe 1 is terminated in the end-fitting 10.

The end-fitting 10 has a rear end 12 comprising a flange with holes 14 adapted for receiving bolts which may attach the end-fitting 10 to a connector. The end-fitting further comprise an inner casing 13 and an outer casing 15.

The flexible unbonded pipe 1 enters the end-fitting 10 at the front end 11 and the carcass 2 and the internal pressure sheath 3 continue into the though-going opening 17 until the carcass 2 is terminated at the carcass ring 18. The carcass ring 18 is embedded in an insulating coating member 19 made from rubber material. The insulating member 19 is also adjacent to the termination of the internal pressure sheath 3. The carcass ring 18 fixates the carcass 2 in the end-fitting by means of lock-nuts (not visible).

The internal pressure sheath 3 is fixed in the end-fitting 10 by means of a ring-shaped member 20 and a further device 21 which is pressed into the surface of the internal pressure sheath 3.

The pressure armour 4 and the electrically insulating layer 5 are terminated adjacent to the ring-shaped member 20 and the further device 21. The pressure armour 4 and the electrically insulating layer 5 are held by a ring-shaped fixing device 22

The tensile armours 6 and 7 are terminated in a cavity 23 formed between the inner casing 13 and the outer casing 15. The cavity 23 is filled with epoxy which fixes the tensile armours 6 and 7, but also functions as insulating material.

The outer sheath 8 is terminated in a recess in the outer casing 15. The end-fitting 10 is equipped with electric wiring. One electric wire 24 connects the carcass ring 18 with a contact point on the surface of the end-fitting. A second electric wire 25 connects the tensile armour 6, 7 with a contact point on the surface of the end-fitting. The two contact points 24 and 25 may be connected to a power source, or alternatively the two contact points 24 and 25 may be mutually connected. The wiring and the contact points are properly insulated by use of suitable insulating material.

The dotted line 9 indicates the center line of the through-going opening 17 and the radius of the through-going opening is indicated by letter R. Thus, FIG. 3 only shows a half part of the through-going opening and the end-fitting.

In the particular embodiment of the end-fitting 1 the inner casing 13 and the outer casing 15 are made from metallic material. Moreover, the parts 20 and 22 are made from a metallic material. The surface 26 of the inner casing 13 facing the through-going opening 17 is coated with a coating 27 having a high electrically resistivity. Also the surface 28 of the outer casing 15 facing the through-going opening 17 is coated with a coating 29 having a high electrically resistivity. Moreover, the surfaces of the 20 and 22 are coated with a coating 30 having a high electrically resistivity. In this embodiment, the coating having a high electrically resistivity is an epoxy coating having an electrically resistivity of more than $10^{10}$ Ω·m and applied with a thickness of approximately 1 mm.

In the embodiment depicted in FIG. 3, all metallic surfaces in the internal part of the end-fitting having an interface to other surfaces have been applied with the epoxy coating, e.g. the interface between the outer casing 15 and the outer sheath 8. Moreover, the surface of the inner casing 13 facing the through-going opening has been applied with a coating 27. Thus, it will not be necessary to cover the surface of the through-going opening with a layer of insulating material. The coating of the metallic surfaces serves to reduce occurrence of stray currents and, thereby, galvanic corrosion of the metallic material in the end-fitting.

What is claimed is:

1. An assembly comprising:
   an end-fitting and an unbonded flexible pipe, said end-fitting being adapted for connecting the unbonded flexible pipe to a connector, said end-fitting having a through-going opening with a centerline and a front end and a rear end, said rear end comprising a flange including a rear-most end face, and said end-fitting further comprising means for establishing an electrical connection to a least one electrical heating system in said unbonded flexible pipe,
   wherein said end-fitting comprises at least one first metallic part having the rear-most end face and having a first surface contacting a second surface of at least one second part in the end-fitting,
   the at least one first metallic part being electrically insulated from the at least one electrical heating system,
   wherein the first surface of the first metallic part includes a portion at and defining the through-going opening having a coating having a high electrically resistivity of at least $10^7$ Ω·m.

2. An assembly according to claim 1, wherein the second part is a metallic part and said second surface comprises a coating having a high electrically resistivity, and wherein said second part is axially spaced from the rear-most end face.

3. An assembly according to claim 1, wherein at least a part of the coating comprises a bushing.

4. An assembly according to claim 1, wherein the second part is a non-metallic part.

5. An assembly according to claim 1, wherein the second part is an electrical insulating part.

6. An assembly according to claim 1, wherein the electrical heating system comprises one or more armour layers selected among carcass, tensile armour and pressure armour.

7. An assembly according to claim 6, wherein the one or more armour layers are axially spaced from the rear-most end face.

8. An assembly according to claim 1, wherein the electrical heating system comprises one or more wires.

9. An assembly according to claim 1, wherein the coating is selected from an epoxy coating, a polyurethane coating, a polytetrafluoroethylene coating, a fluorinated ethylene propylene coating, a polyvinyl chloride coating, an enamel coating, a ceramic coating, a glass coating and combinations thereof.

10. An assembly according to claim 1, wherein the coating is applied with a thickness from about 0.05 mm to about 5 mm.

11. An assembly according to claim 1, wherein the end-fitting comprises an insulating coating on the outer surface.

12. An assembly according to claim 1, wherein the end-fitting comprises a protective sleeve.

13. An assembly according to claim 1, wherein the end-fitting is housed in an electrical insulating housing.

14. An assembly according to claim 1, wherein said at least one electrical heating system is axially spaced from the rear-most end face.

15. An assembly according to claim 1, wherein said at least one electrical heating system includes at least a pair of wires extending radially through the end-fitting to an outer surface of the end-fitting, the pair of wires being insulated from the end-fitting, and the end-fitting configured to allow connection of each wire of the pair of wires to an armour layer of the flexible pipe while insulating the end-fitting therefrom.

16. A method for reducing the risk of galvanic corrosion in an end-fitting for connecting an unbonded flexible pipe comprising electrical heating means to a connector, said method comprises:
   providing an end-fitting having a flange and a through-going opening with a centerline and a front end and a rear end, said rear end including a rear-most end face, and the end-fitting comprising means for establishing an electrical connection to the heating means in said unbonded flexible pipe, said end-fitting comprises at least one first metallic part having the rear-most end face and having a first surface adapted for contacting a second surface of at least one second part in the end-fitting and having a portion of the first surface disposed at and defining the through-going opening;
   subjecting the first surface and the second surface of the first metallic part for a treatment to obtain a substantially clean surface;
   applying a coating having a high electrical resistance to the cleaned first surface and the cleaned second surface; and
   curing the applied coating to obtain a coating being an electrically insulating coating having an electrically resistivity of at least $10^7$ Ω·m,
   wherein the end-fitting includes at least the first metallic part being electrically insulated from the heating means.

17. A method according to claim 16, wherein the second surface of the second part is subjected to a treatment to obtain a substantially clean second surface and applying the clean second surface with a coating having a high electrical resistance.

18. A method according to claim 16, wherein the coating is selected from an epoxy coating, a polyurethane coating, a polytetrafluoroethylene coating, a fluorinated ethylene propylene coating, an enamel coating and combinations thereof.

19. A method according to claim 16, wherein treatment of the surface is a sand blasting, a mechanical cleaning, a chemical etching, an electro polishing or a combination of two or more of the mentioned treatments.

20. A method according to claim 16, comprising the further step of applying an adhesive layer to the cleaned surface.

21. An assembly comprising:
   an end-fitting and an unbonded flexible pipe, said end-fitting being adapted for connecting the unbonded flexible pipe to a connector, said end-fitting having a through-going opening with a centerline and a front end and a rear end, said rear end comprising a flange including a rear-most end face, and said end-fitting further comprising means for establishing an electrical connection to a least one electrical heating system in said unbonded flexible pipe, wherein said end-fitting comprises at least one first metallic part having the rear-most end face and having a first surface contacting a second surface of at least one second part in the end-fitting, the at least one first metallic part being electrically insulated from the at least one electrical heating system, wherein the first surface of the first metallic part includes a portion at and defining the through-going opening-having a coating having a high electrically resistivity of at least $10^7$ am, and wherein the unbonded flexible pipe enters the end-fitting at the front end and is terminated in the end-fitting and wherein said first surface of the first metallic part defining the through-going opening is located further away from the unbonded flexible pipe than the means for establishing an electrical connection.

* * * * *